UNITED STATES PATENT OFFICE.

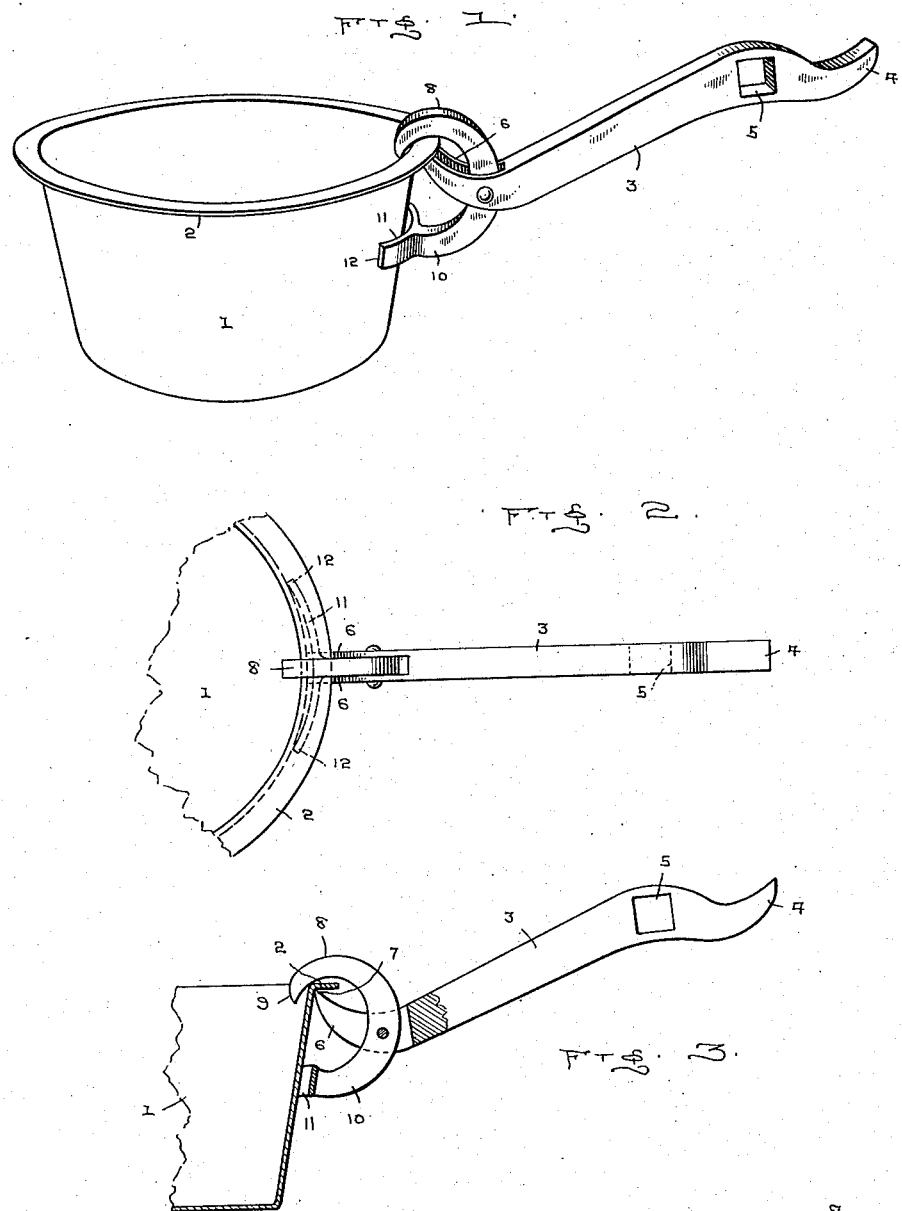

WILLIAM B. KENNEDY, OF WARM RIVER, IDAHO.

DETACHABLE HANDLE FOR COOKING UTENSILS.

1,217,010.  Specification of Letters Patent.  Patented Feb. 20, 1917.

Application filed August 7, 1915. Serial No. 44,248.

*To all whom it may concern:*

Be it known that I, WILLIAM B. KENNEDY, a citizen of the United States, residing at Warm River, in the county of Fremont and State of Idaho, have invented certain new and useful Improvements in Detachable Handles for Cooking Utensils; and I do hereby declare the following to be a full, clear, and exact description of the invention, such as will enable others skilled in the art to which it appertains to make and use the same.

My invention relates to new and useful improvements in detachable handles for cooking utensils and my object is to provide in connection with a lid lifter and shaker means for engaging cooking utensils for removing the same from the stove without bringing the hand in contact with the utensil.

A further object is to so arrange the parts contacting with the cooking utensil that said utensil will be held against swinging movement with respect to the handle member.

And a further object is to so construct the gripping parts of the handle that they can be quickly attached to or removed from engagement with the utensil.

Other objects and advantages will be hereinafter set forth and more particularly pointed out in the accompanying specification.

In the accompanying drawings which are made a part of this application,

Figure 1 is a perspective view of a handle applied to use.

Fig. 2 is a top plan view thereof, and

Fig. 3 is an elevation partly in section of the handle applied to use.

Referring to the drawings in which similar reference numerals designate corresponding parts throughout the several views, 1 indicates a cooking utensil which may be constructed in any preferred manner and having a flange or bead 2 at the upper edge thereof as is usual in utensils of this class. In order to readily remove the utensil while food stuffs are cooking therein, I provide my improved form of handle which comprises a shank 3, one end of which is formed into a lid lifter 4, used for removing ordinary lids from the stove, said shank adjacent the end having the lid lifter, being provided with a socket 5 into which is adapted to be introduced the stem of a grate when the handle is to be used for shaking the ashes from the grate.

The opposite end of the shank 3 is bifurcated, thus forming arms 6, which arms are curved upwardly and terminate in points 7 which points pass below and engage the lower edge of the flange or bead 2 when the handle is used for lifting utensils.

Pivotally mounted between the arms 6 is a curved gripping jaw 8, the upper end 9 of which is so arranged that it will extend over and engage the upper inner face of the utensil and securely clamp the flange of the utensil against the points 7 of the arms when upward lifting movement is imparted to the handle. The lower end 10 of the gripping jaw 8 is provided with a curved extension 11, which extension is preferably integral with the end 10 and projects transversely from each side thereof, the curvature of the extension being more acute than the curvature of the utensil so that the ends 12 only of the extensions will engage the wall of the utensil.

By constructing the extension in this manner, the utensil will be held against tilting action when being transported through the medium of the handle and the utensil can be tilted to empty the contents thereof without effecting the relation of the utensil with the handle.

The gripping jaw 8 is so suspended between the arms 6 as to be substantially balanced, thus retaining the end 9 of the gripping jaw in such position with respect to the points 7 of the arms that said end and points will always be in position to be introduced into engagement with the edge of the utensil.

In applying the device to use the points 7 of the arms are introduced below the flange of the utensil while the end 9 is projected over the flange, the ends of the curved extensions 11 moving into engagement with the base of the utensil, when by lifting upon the shank portion of the handle the edge of the utensil will be securely clamped between the points and jaw and the ends of the curved extension 11 will be firmly engaged with the face of the utensil and when so engaged the utensil can be transported to any desired point, and in view of the manner in which the ends 12 of the extension engage the utensil, said utensil will be held against tilting action with respect to the handle. If desired, however, the handle may be operated to tilt the utensil in order to empty the contents thereof but said utensil will still be held against tilting action with respect to the handle, thus obviating the possibility of twisting or otherwise injuring the flange of the utensil.

When the handle is not being used in connection with the cooking utensil, it may be employed for lifting the lids from the stove or for shaking the grate of the stove to remove the ashes therefrom, and as all of the parts are constructed of metal, the handle will be rendered extremely strong and durable and practically indestructible from use.

It will likewise be seen that in view of the simplicity of the device it can be very cheaply constructed.

Having thus fully described my invention what I claim as new and desire to secure by Letters Patent of the United States is:—

A handle for utensils comprising a shank having one of its ends bifurcated to form arms, said arms being curved upwardly and pointed at their free ends, a curved substantially G-shaped gripping jaw pivotally mounted between said arms, said ends of the gripping jaw projecting a distance beyond the ends of said arms, the upper end of the gripping jaw being given a more abrupt downward trend at its terminus than the curvature of the remainder of said jaw, whereby the ends of said arms will coact with said abruptly bent end to grip and retain an object therebetween, an extension integral with the lower end of the gripping jaw and at right angles to the swinging movement of the jaw, said extension being flat in cross section and curved from end to end, the ends of said extension being an equal distance on opposite sides of the jaw, the curvature of the extension being adapted to be more acute than the curvature of the utensil with which it is engaged whereby the ends of the extension only will engage the utensil.

In testimony whereof I have signed my name to this specification in the presence of two subscribing witnesses.

WILLIAM B. KENNEDY.

Witnesses:
 RALPH WILKIE,
 DEE L. DAVIS.

Copies of this patent may be obtained for five cents each, by addressing the "Commissioner of Patents, Washington, D. C."